United States Patent
Lorenzen

(10) Patent No.: US 8,019,286 B2
(45) Date of Patent: Sep. 13, 2011

(54) METHOD AND SYSTEM FOR DETERMINING THE AMPLITUDE AND/OR PHASE OF THE OUTPUT SIGNAL FOR A TRANSMISSION BODY DEPENDING ON THE AMPLITUDE OF THE INPUT SIGNAL

(75) Inventor: Rolf Lorenzen, Unterhaching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 755 days.

(21) Appl. No.: 11/914,379

(22) PCT Filed: Apr. 12, 2006

(86) PCT No.: PCT/EP2006/003394
§ 371 (c)(1),
(2), (4) Date: Apr. 7, 2008

(87) PCT Pub. No.: WO2006/122615
PCT Pub. Date: Nov. 23, 2006

(65) Prior Publication Data
US 2008/0171518 A1    Jul. 17, 2008

(30) Foreign Application Priority Data

May 19, 2005  (DE) .......................... 10 2005 023 112
Aug. 10, 2005  (DE) .......................... 10 2005 037 880

(51) Int. Cl.
*H04B 17/00*    (2006.01)

(52) U.S. Cl. ................ 455/67.11; 455/226.1; 455/67.13

(58) Field of Classification Search .... 455/226.1–226.4, 455/67.11–67.16
See application file for complete search history.

(56) References Cited

U.S. PATENT DOCUMENTS

| | | | |
|---|---|---|---|
| 4,110,798 A * | 8/1978 | Miller et al. .................. | 375/229 |
| 5,511,129 A * | 4/1996 | Craven et al. ................. | 381/103 |
| 2002/0168023 A1 | 11/2002 | Schrader | |

FOREIGN PATENT DOCUMENTS

| | | |
|---|---|---|
| DE | 19813703 A1 | 2/1999 |
| DE | 19919592 A1 | 11/2000 |
| WO | 9905784 A1 | 2/1999 |
| WO | 03043182 A1 | 5/2003 |
| WO | 2006056344 A1 | 6/2006 |

* cited by examiner

*Primary Examiner* — Lana Le
(74) *Attorney, Agent, or Firm* — Christensen O'Connor Johnson Kindness PLLC

(57) ABSTRACT

A method and a system for determining the amplitude and/or the phase of the output signal of a transmission link dependent upon the amplitude of the input signal (AM-AM and/or AM-PM characteristic) impresses a test signal (s(t)) on the transmission link (14), measures the response signal (e(t)) resulting from the test signal (s(t)) by amplitude and/or phase distortion in the transmission link (14) and determines the amplitude response ($|e(t)|$) of the response signal (e(t)) and/or the phase responses ($\phi_s(t)$, $\phi_E(t)$) of the test signal (s(t)) and of the response signal (e(t)) dependent upon the amplitude response ($|s(t)|$) of the test signal (s(t)). The amplitude response ($|s(t)|$) of the test signal (s(t)) consists of several first and second response segments with constant amplitude values over the duration ($\Delta T$) of the respective first or second response segment.

8 Claims, 6 Drawing Sheets

METHOD AND SYSTEM FOR DETERMINING THE AMPLITUDE AND/OR PHASE OF THE OUTPUT SIGNAL FOR A TRANSMISSION BODY DEPENDING ON THE AMPLITUDE OF THE INPUT SIGNAL

The invention relates to a method and a system for determining the amplitude and/or phase of the output signal of a transmission link dependent upon the amplitude of the input signal (AM-AM and AM-PM characteristic).

Communications transmission links, for example, amplifiers in the receiver or transmitter unit of a mobile telephone, provide non-linear transmission behaviour. This nonlinear transmission behaviour leads to undesirable amplitude and phase distortions of the signal to be amplified. In order to compensate for these undesired distortion effects, it is already known that an equalising network, of which the characteristic is ideally designed to be inverse to the non-linear transmission characteristic of the transmission link, can be connected in series to the non-linear transmission link.

The amplitude and phase of the output signal of the transmission link dependent upon the amplitude of the input signal (AM-AM and AM-PM characteristic) are therefore required in order to design the characteristic of the equalising network. A determination of the amplitude characteristic of the transmission link is obtained from the functional context of the amplitude or respectively power of the signal at the output of the transmission link dependent upon the amplitude or respectively power of the corresponding signal at the input of the transmission link within a defined amplitude or respectively power range of the signal at the input of the transmission link. The phase response of the transmission link once again represents the functional context of the phase change of the signal between the output and input of the transmission link dependent upon the amplitude or respectively power of the signal at the input of the transmission link within a defined amplitude or respectively power range of the signal at the input of the transmission link.

WO 99/05784 A1 describes a method and a device for measuring the amplitude and phase distortion of a high-frequency power amplifier. In this context, the signal at the respective input and output of the high-frequency power amplifier is measured via synchronous demodulators. The ratio of the input to the output amplitude or respectively power is determined in order to present the amplitude characteristic, while, the phase value associated with the respective amplitude or respectively power of the signal at the input is determined in order to present the phase characteristic comprising the in-phase and quadrature components of the output signal. The entire characteristic of the amplitude and phase response is determined by specifying a given signal response at the input of the high-frequency power amplifier by means of a signal generator. The synchronisation between the signal at the input and output of the high-frequency power amplifier is implemented via a reference carrier signal between the individual synchronous demodulators.

In calibrating power amplifiers in the receiver and/or transmitter units of mobile telephones, the procedure described in WO 99/05784 A1 of measuring two signals, at the input and at the output of the power amplifier, and the additionally-required synchronisation of the two signals is excessively costly in terms of time and functions.

The invention is therefore based upon the object of providing a method and a system for determining the amplitude and/or phase of the output signal of a transmission link dependent upon the amplitude of the input signal, which are optimised with regard to minimal processing time and maximum process security.

The object of the invention is achieved by a method for determining the amplitude and/or phase of the output signal of a transmission link dependent upon the amplitude of the input signal with the features according to claim 1 and by a system for determining the amplitude and/or phase of the output signal of a transmission link dependent upon the amplitude of the input signal with the features according to claim 12. Advantageous further developments of the invention are specified in the dependent claims.

With the method according to the invention and with the system according to the invention for determining the amplitude and/or phase of the output signal of a transmission link dependent upon the amplitude of the input signal, only the signal at the output of the transmission link is measured according to the invention. The signal, which is impressed at the input of the transmission link and is no longer measured, must therefore be known and, in order to determine the amplitude and phase characteristic of the transmission link correctly, must be synchronised with reference to time, frequency and phase with the signal at the input of the transmission link and must therefore provide no time, frequency and/or phase offsets.

A signal known to the system is achieved at the input of the transmission link, in that the user specifies a known test signal via a unit for superordinate procedural control to a transmission unit in order to generate the signal at the input of the transmission link.

A time offset between the signal at the input of the transmission link and the response signal at the output of the transmission link resulting from the test signal through amplitude and phase distortion in the transmission link is avoided by using a test signal, which provides a time characteristic with several response segments, each of which provides a constant amplitude response with amplitude values differing from one another, instead of a continuous time characteristic. If a given uncertainty interval is waited for in each of these response segments of the test signal after the adjustment of the respective amplitude value by the signal generator of the test signal, the amplitude value of the response signal can then be measured without the implementation of a time synchronisation and compared with the adjusted amplitude value of the test signal in order to achieve a correct AM-AM characteristic, because stationary conditions continue to predominate at the input and output of the transmission link. The phase value of the response signal for determining the AM-PM characteristic can also be measured without the implementation of a time synchronisation, because the phase of the response signal can be regarded in a good approximation as constant during one response segment and accordingly, stationary conditions predominate at the input and output of the transmission link in this case also.

However, assuming an absence of phase distortion because of a constant amplitude response of the test signal over several response segments of the test signal, the phase of the response signal can change as a result of a phase drift. This phase drift is compensated in determining the AM-PM characteristic in that the phase of the response signal measured at the output of the transmission link for each amplitude value of the test signal at the input of the transmission link is compared according to the invention with a reference phase. For this purpose, a test signal is generated, which is composed of first response segments with amplitude values changed relative to one another alternating with second response segments with amplitude values un-changed relative to one another. If, according to the invention, the respective difference between the phase value of the response signal measured in a first response segment and the phase value of the response signal measured in the subsequent, second response segment is formed, interfering phase drift is removed from the phase difference obtained in this manner, provided the phase drift is approximately un-changed between a first and a subsequent second response segment. As a result of the un-changed amplitude of the test signal over all second response segments, the amplitude-dependent phase distortions of the response signal are constant in all second response segments and allow a phase referencing, which is de-coupled from the amplitude-dependent phase distortion.

It is disadvantageous that the phase response of the response signal cannot be constant within the individual response segments of the test signal because of a frequency offset in the response signal, but can instead provide a linear, ascending characteristic. In order to compensate for this phase error of the response signal caused by a frequency offset in the response signal, the respectively-occurring frequency offset can be estimated, according to the known methods of the prior art, in each individual response segment of the test signal. From the frequency offset estimated for each response segment of the test signal, an average frequency offset is calculated via an average formation for the entire phase response of the response signal by additionally weighting the individual frequency offsets with the associated amplitude values of the test signal. This weighting of the individual frequency offsets with the associated amplitude values of the test signal takes into consideration the more precise estimation of the frequency offset in response segments with higher amplitude values of the test signal because of an improved signal-noise interval predominating there.

An exemplary embodiment of the method according to the invention for measuring the amplitude and phase response of a transmission link and of the system according to the invention for measuring the amplitude and phase response of a transmission link is explained in greater detail below with reference to the drawings.

Figure 6A:
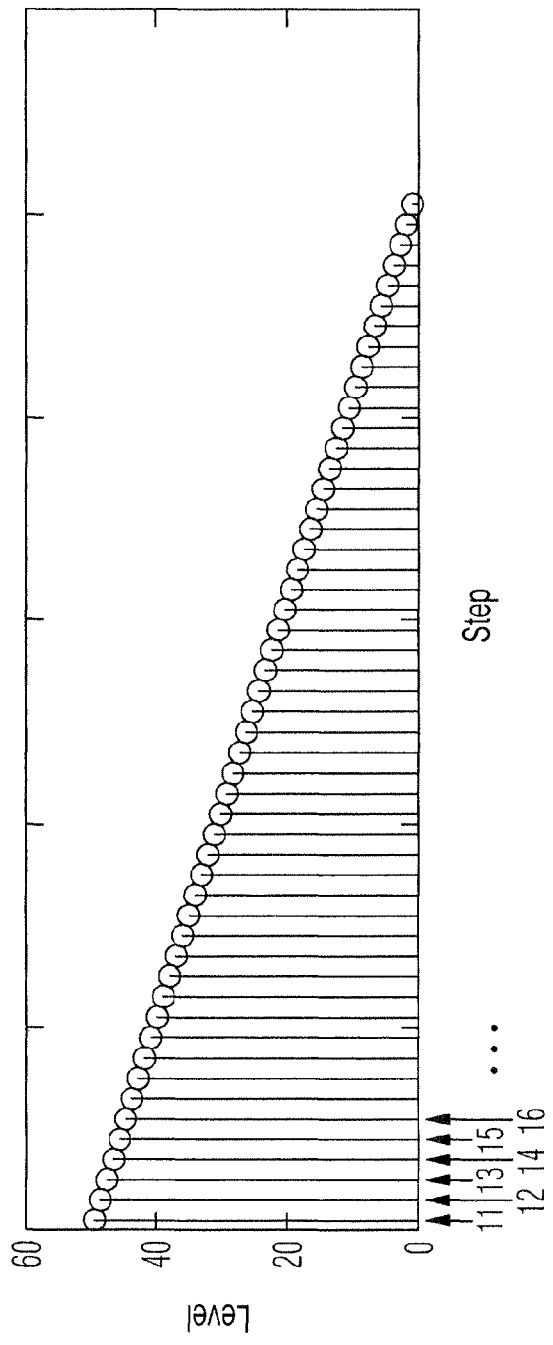
Figure 6B:
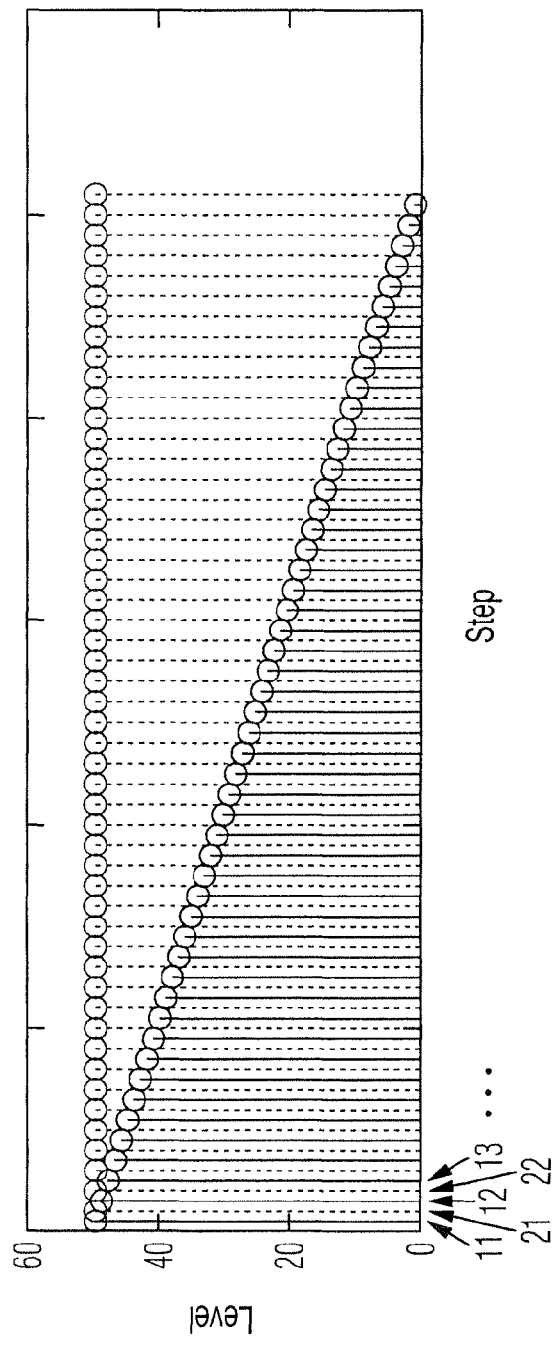
Figure 7A:
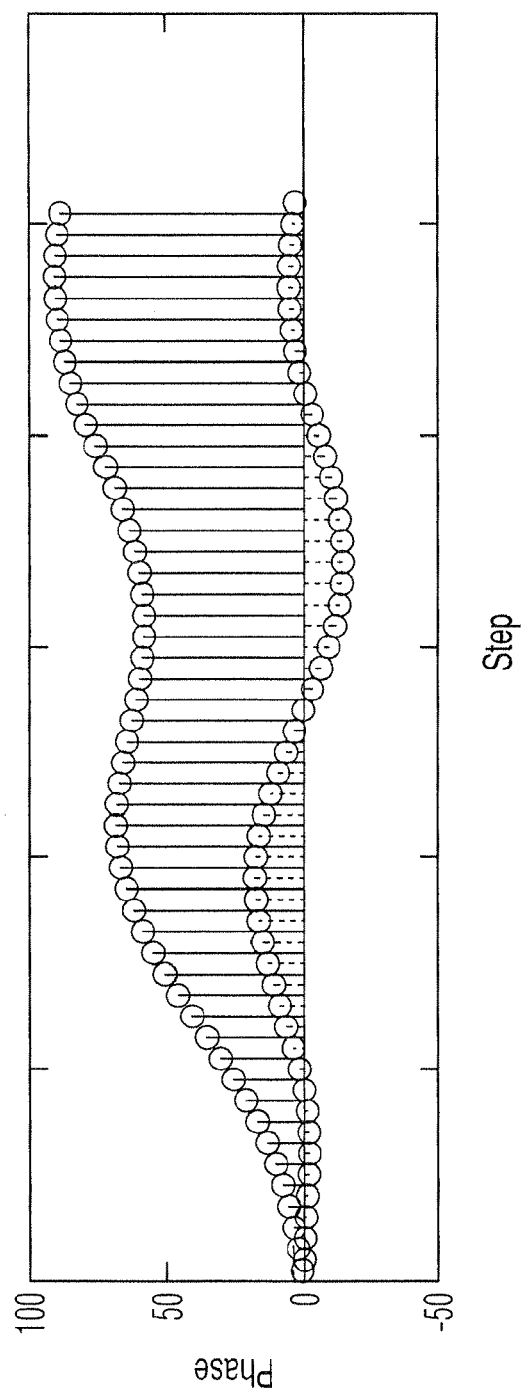
Figure 7B:
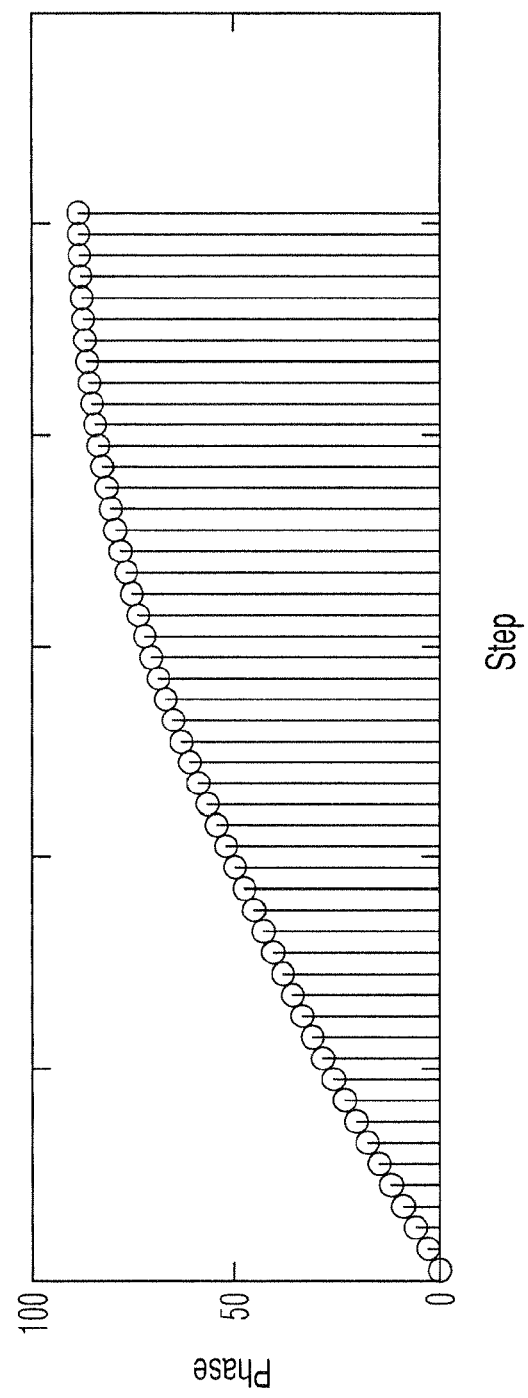

FIGS. 6A, 6B shows a time-flow diagram of the amplitude values of the test signal for determining the AM-AM and the AM-PM characteristic of transmission link; and FIGS. 7A, 7B shows a time-flow diagram of the phase values of the response signal with a phase error on the basis of the superimposition of AM-PM distortion and phase drift, with a phase error resulting from a phase drift and with a phase error resulting from AM-PM distortion.

Figure 1:
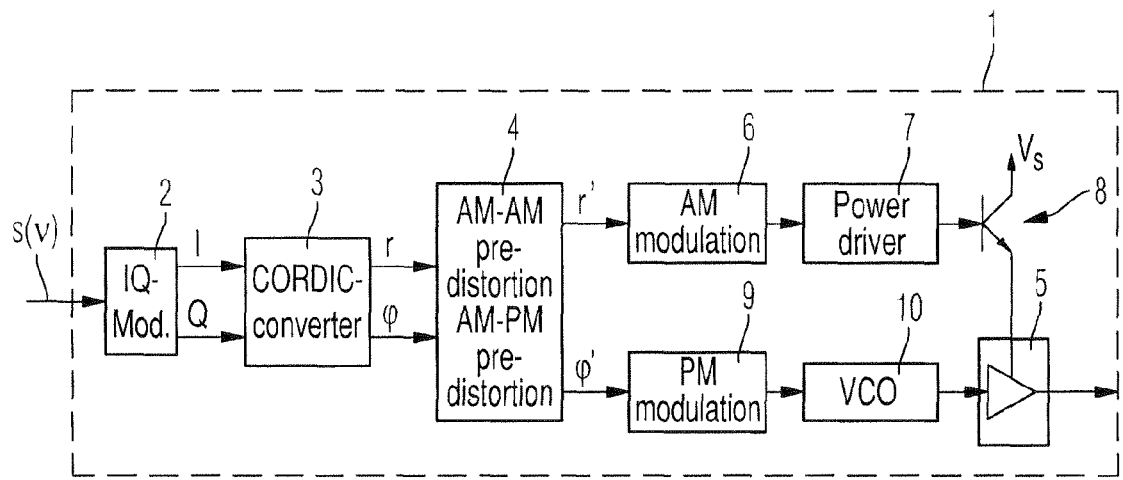
FIG. 1 shows a block circuit diagram of a polar modulator to be calibrated for a mobile telephone.
Figure 2:
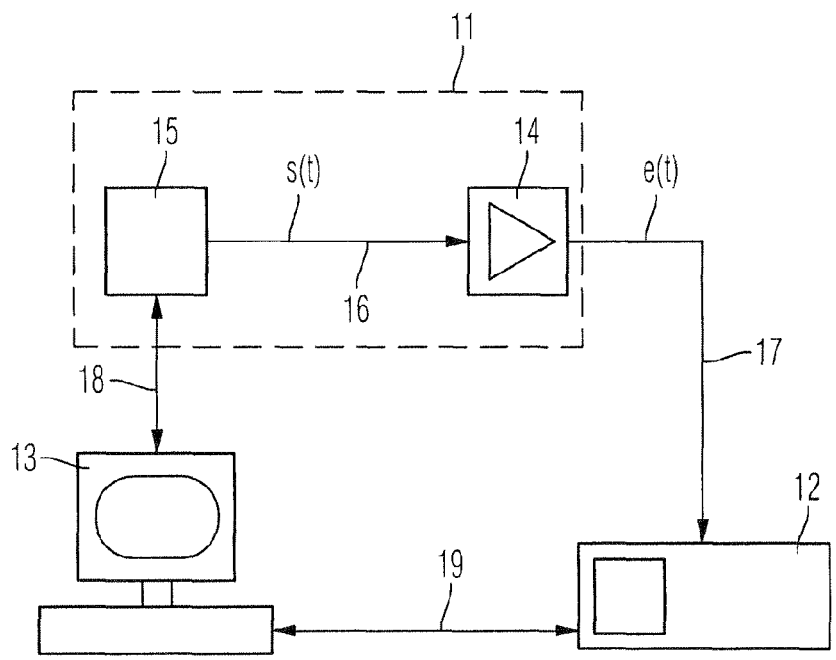
FIG. 2 shows a block circuit diagram of a system according to the invention for measuring the AM-AM and the AM-PM characteristic of transmission link.
Figure 4:
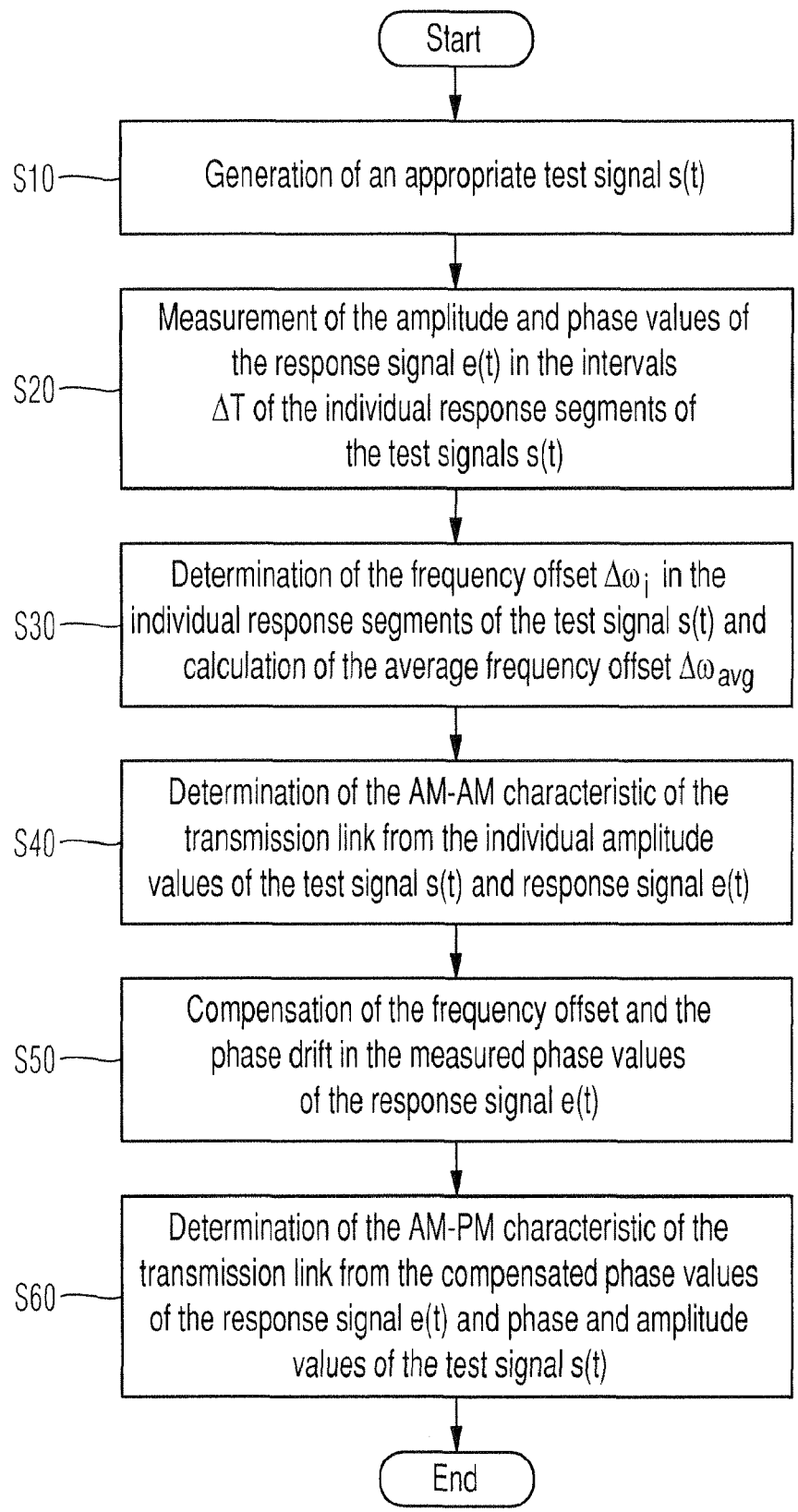
FIG. 4 shows a flow chart for a method according to the invention for measuring the AM-AM and the AM-PM characteristic of a transmission link.

Before describing the system according to the invention and the method according to the invention for determining the amplitude and phase response of a general transmission link with reference to FIG. 2 and FIG. 4, the structure and respective functioning of a polar modulator for a mobile telephone will first be presented with reference to FIG. 1, of which the calibration can be regarded as a preferred application of the method according to the invention and the system according to the invention for measuring the amplitude and phase characteristic of a transmission link.

The polar modulator 1 is supplied from a signal source, which is not shown in FIG. 1, with a symbol sequence s(n) to be transmitted. With the assistance of a carrier signal, an IQ modulator 2 generates from the signal sequences s(v) the in-phase and quadrature components I and Q of a quadrature signal to be transmitted by the mobile telephone. The in-phase and quadrature components I and Q of the quadrature signal are converted via a CORDIC converter 3 into corresponding amplitude and phase components r and φ (polar coordinates) of the signal to be transmitted.

A separate pre-distortion of the amplitude component r and the phase component φ takes place in a subsequent pre-distortion unit 4. As a result of the pre-distortion, an amplitude and phase distortion of the signal to be transmitted caused in the subsequent power amplifier 5 is compensated, and a signal to be transmitted is generated accordingly in the polar modulator 1, which ideally provides no amplitude and phase distortion.

In an amplitude modulator 6, the pre-distorted amplitude component r' is then converted substantially via a multiplying digital-analog converter into the level range required to control a subsequent power driver 7. The power driver 7 controls a power transistor 8, which is supplied from a voltage source $V_s$ and serves as an external power output stage of the power amplifier 5.

In parallel with the amplitude modulation path, the pre-distorted phase component φ' is supplied to a phase modulator 9 in a phase modulation path. The phase modulator 9 generates from the phase component φ' a signal, which corresponds to the frequency of the time-rotating phase component φ' and serves as a set frequency value for a subsequent voltage-controlled frequency oscillator (VCO) 10. The frequency signal generated by the voltage-controlled frequency oscillator 10 is supplied to the power amplifier 5 and amplified with regard to its amplitude in the power transistor 8 serving as the power end-stage and transferred at the output of the power amplifier 5 to the antenna of the mobile telephone.

For the pre-distortion in the pre-distortion unit 4 of the amplitude component r and phase component φ of the signal to be transmitted, the amplitude pre-distortion characteristic (AM-AM pre-distortion characteristic) and the phase-pre-distortion characteristic (AM-PM pre-distortion characteristic) must be determined. In an ideal pre-distortion, this is inverse to the respective amplitude-distortion characteristic (AM-AM distortion characteristic) and phase distortion characteristic (AM-PM distortion characteristic) of the power amplifier 5. Accordingly, for a distortion-free operation of the polar modulator 1 of the mobile telephone, the determination of the amplitude and phase response of the power amplifier 5 must be investigated within the framework of a calibration procedure of the mobile telephone.

The description below presents a system according to the invention for determining the amplitude and phase response of a general transmission link as shown in FIG. 2 starting from a power amplifier 5 of a polar modulator 1 for a mobile telephone as shown in FIG. 1.

The system according to the invention consists of a device under test (DUT) to be calibrated 11, which corresponds to the polar modulator 1 of the mobile telephone in FIG. 1; a measuring device 12; and a unit for superordinate procedural control 30, which is realised, for example, by a personal computer. The device under test 11 to be calibrated once again consists of a transmission link 14, which corresponds to the power amplifier 5 of the polar modulator 1 illustrated in FIG. 1, with a generally non-linear amplitude and phase characteristic.

The transmission link 14 is supplied from the transmission unit 15, which corresponds as a whole to the functional units 2, 3, 4, 6, 7, 8, 9 and 10 of the polar modulator 1 shown in FIG. 1, via the uni-directional connection line 16, with a test signal s(t), which consists of an amplitude component |s(t)| and a phase component $\phi_s(t)$, and delivers a response signal e(t) distorted corresponding to its amplitude and phase characteristic, which consists of an amplitude component |e(t)| and a phase component $\phi_E(t)$, via the uni-directional connecting line 17, to the device under test 12. The unit for superordinate procedural control 13 communicates via the bi-directional connecting line 18 with the transmission unit 15 and via the bi-directional connecting line 19 with the measuring device 12.

Figure 3:
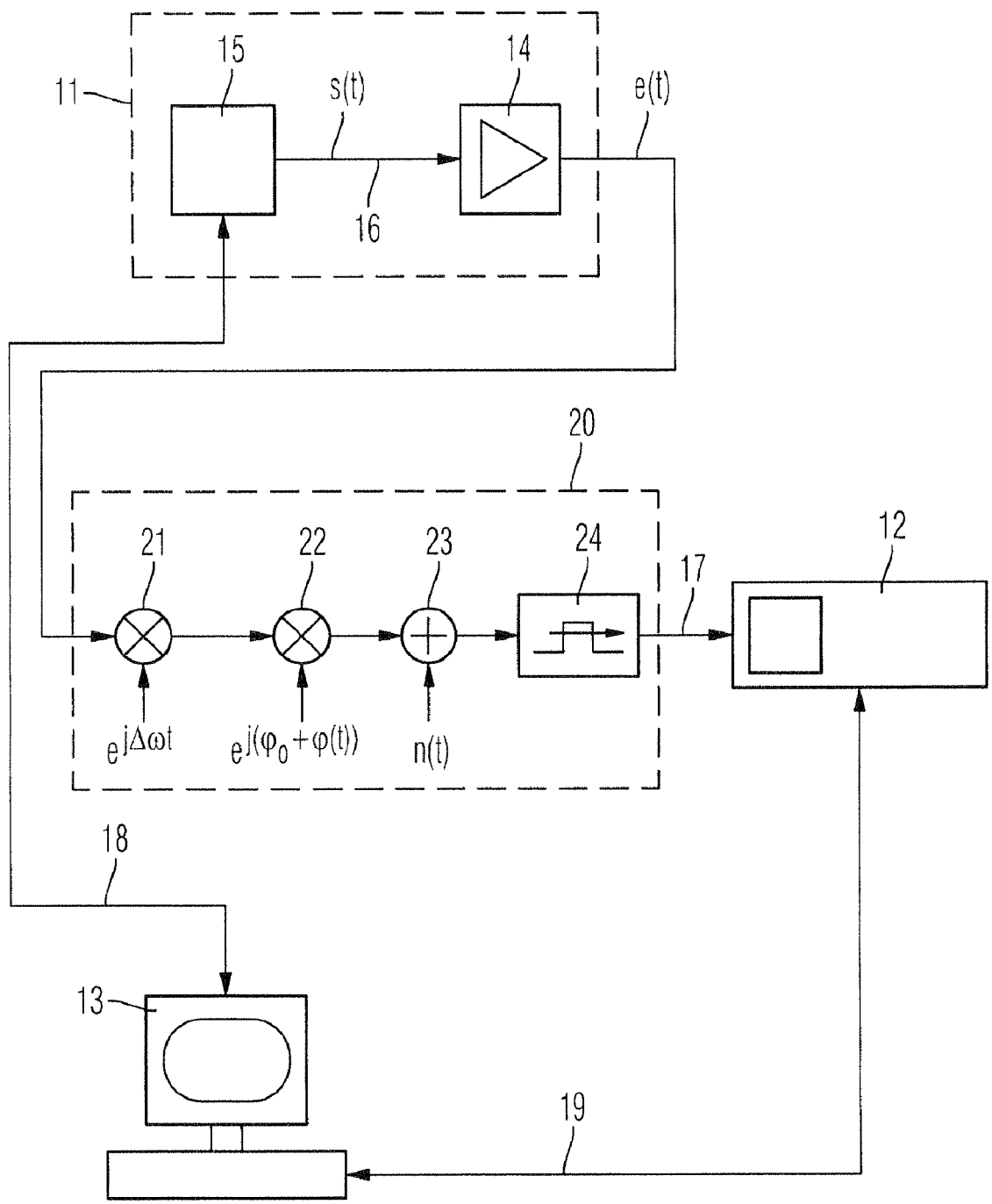
FIG. 3 shows an error model for synchronisation errors in the calibration of a polar modulator for a mobile telephone.

FIG. 3 presents an error model 20, which, with the exception of the AM-AM distortions and AM-PM distortions, contains all of the errors to be taken into consideration for the calibration of the transmission link 14, connected in series to the calibrating transmission link 14 of the system according to the invention for determining the amplitude and phase characteristic of a general transmission link 14.

Via the multiplication element 21, a term $e^{-j\Delta\omega \cdot t}$, which models a frequency offset $\Delta\omega$ on the basis of an absence of frequency synchronisation in the calibration, is superimposed over the response signal e(t) in the error model 20. In the subsequent multiplication element 22 of the error model 20, a term $e^{-j(\Phi_0 + \Phi(t))}$, which models a start phase $\phi_0$ and a phase drift $\phi$ on the basis of an absence of phase synchronisation in the calibration, is superimposed over the response signal e(t). The subsequent adding unit 23 of the error model 20 superimposes a noise signal n(t) over the response signal e(t). Finally, in the concluding time-delay element 24 of the error model 20, a time delay between the transmission signal s(t) and the response signal e(t) is modelled on the basis of an absence of time synchronisation in the calibration.

In the description below, the method according to the invention for measuring the AM-AM and the AM-PM characteristic of a transmission link 14 is described with reference to FIG. 4. In this context, particular reference is made to the time, frequency and phase synchronisation required for the correct measurement of the AM-AM and the AM-PM characteristic of the transmission link.

Figure 5:
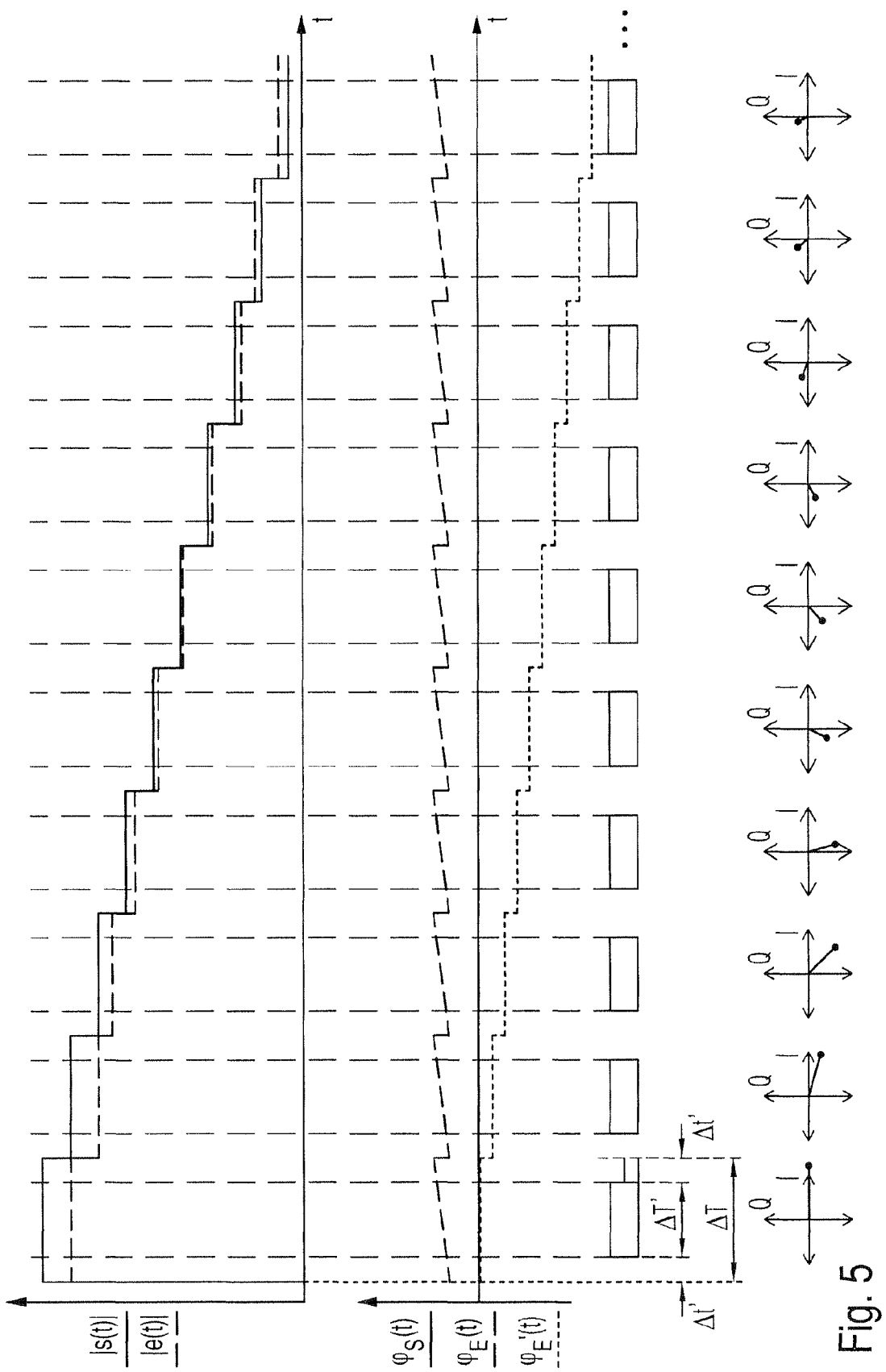
FIG. 5 shows a time-flow diagram of the amplitude and phase response of the test signal and of the response signal.

In procedural stage S10 of the method according to the invention for measuring the AM-AM and the AM-PM characteristic of a transmission link 14, a transmission signal s(t) is generated by the transmission unit 15. As shown in FIG. 5 in the upper time-flow diagram, this transmission signal s(t) provides, an amplitude response |s(t)|, which is characterised by intrinsically-constant response segments, such as the "descending stair function" shown in FIG. 5. The lower time-flow diagram of FIG. 5 shows the phase response $\phi_s(t)$ of the transmission signal s(t), which, according to the invention, provides a constant and identical value over all response segments of the transmission signal s(t), shown as a continuous line in FIG. 5 with the exemplary value zero.

According to the invention, the amplitude response |s(t)| of the transmission signal s(t) according to FIG. 6A provides first response segments 1i of the length $\Delta T$ with amplitude values $|s_{1i}|$ changed relative to one another. The AM-AM characteristic of the transmission link 14 can be determined with a transmission signal s(t), which provides an amplitude response |s(t)| as shown in FIG. 6A, because of the amplitude values $|s_{1i}|$ changed relative to one another. An amplitude response |s(t)| of the transmission signal s(t) according to FIG. 6B is used to determine the AM-PM characteristic of the transmission link 14 according to the invention. This also consists of intrinsically-constant response segments $\Delta T$, but contains first response segments 1i with amplitude values $|s_{1i}|$ changed relative to one another—shown as a continuous line in FIG. 6B—in alternation with second response segments 2i with amplitude values $|s_{2i}|$ un-changed relative to one another—broken line in FIG. 6B. In order to guarantee first and second response segments with respectively-constant amplitude values $|s_{1i}|$ and $|s_{2i}|$ allowing a correct measurement of the AM-AM and AM-PM characteristic, a given uncertainty interval $\Delta t'$ is waited for at the beginning of each first and second response segment 1i or respectively 2i, until stationary conditions predominate at the input of the transmission link 14 in the following interval $\Delta T'$ after a transient initial response of the transmission unit 15.

In the following procedural stage S20, during the intervals $\Delta T'$ of the first and second response segments 1i and 2i of the transmission signal s(t), the respective amplitude values $|e_{1i}|$ and $|e_{2i}|$ and phase values $\phi_{E1i}$ and $\phi_{E2i}$ of the response signal e(t) are measured. As shown in FIG. 5, the amplitude response |e(t)| of the response signal e(t) in the first and second response segments 1i and 2i of the transmission signal s(t)—shown as a broken line in the upper time-flow diagram of FIG. 5—provides constant response segments with the associated amplitude values $|e_{1i}|$ and $|e_{2i}|$ at least within the range of the intervals $\Delta T'$.

In the case of a superimposed frequency offset $\Delta\omega$, in the first and second response segments 1i and 2i of the transmission signal s(t), the phase response $\phi_E(t)$ of the response signal e(t) in the lower time-flow diagram of FIG. 5 provides in each case a linear ascending phase response—broken line in the lower time-flow diagram of FIG. 5; with a compensation of the superimposed frequency offset $\Delta\omega$, the phase response $\phi_E(t)$ of the response signal e(t) in the first and second response segments 1i and 2i of the transmission signal s(t) provides in each case a constant phase response—dotted line in the lower time-flow diagram of FIG. 5. The unsteadiness in the phase response $\phi_E(t)$ of the response signal e(t) at the transitions between the first and second response segments 1i and 2i of the transmission signal s(t) result from the amplitude-value change of the transmission signal at the transitions and the dependence of the phase $\phi_E(t)$ of the response signal e(t) upon the amplitude |s(t)| of the transmission signal s(t) corresponding to the AM-PM characteristic of the transmission link 14.

Procedural stage S30 comprises the estimation of the frequency offset $\Delta\omega_i$ in the individual first and second response segments 1i and 2i of the response signal e(t) according to the method of the prior art, to which further reference need not be made in the present description. Since the estimation of the individual frequency offsets $\Delta\omega_{1i}$ and respectively $\Delta\omega_{2i}$ is provided respectively with a statistical estimation error, an averaged frequency offset $\Delta\omega_{avg}$, which is used for all of the first and second response segments 1i and 2i of the response signal e(t) in the description below, is calculated in order to compensate the frequency offset $\Delta\omega$ in the phase response $\phi_E(t)$ of all of the estimated frequency offsets $\Delta\omega_{1i}$ and respectively $\Delta\omega_{2i}$. For this purpose, each estimated frequency offset $\Delta\omega_{1i}$ and respectively $\Delta\omega_{2i}$ is weighted according to equation (1), in one of the first and second response segments 1i and 2i of the response signal e(t) with the associated amplitude value $|e_{1i}|$ or $|e_{2i}|$ of the response signal e(t).

$$\Delta\omega_{avg} = \frac{1}{\sum_{i=1}^{N}(|e_{1i}|+|e_{2i}|)} \cdot \sum_{i=1}^{N}(\Delta\omega_{1i}\cdot|e_{1i}|+\Delta\omega_{2i}\cdot|e_{2i}|) \quad (1)$$

In the next procedural stage S40, the AM-AM characteristic of the transmission link 14 is determined for each of the first and second response segments 1i and 2i of the transmission signal s(t) from the ratio of the amplitude values $|s_{1i}|$ and respectively $|s_{2i}|$ of the transmission signal s(t) to the amplitude values $|e_{1i}|$ and respectively $|e_{2i}|$ of the response signal e(t).

In procedural stage S50, a compensation of a frequency offset $\Delta\omega_{1i}$ or $\Delta\omega_{2i}$ present in the respective individual first and second response segments 1i and 2i of the measured phase response $\phi_E(t)$ of the response signal e(t) is implemented by compensating the entire phase response $\phi_E(t)$ of the response signal e(t) with the average frequency offset $\Delta\omega_{avg}$ determined in procedural stage S40 (transfer from the broken line into the dotted line in FIG. 5). The phase values $\phi_{E1i}'$ and $\phi_{E2i}'$ of the response signal e(t) accordingly determined in the first and second response segments 1i and 2i and therefore additionally frequency-offset-compensated are adjusted with regard to any occurring phase drift $\phi_i$ in procedural stage S50. For this purpose, a phase referencing by forming a phase difference $\phi_{Ei}''$ between the frequency-offset-compensated phase value ($\phi_{E1i}'$ of the response signal e(t) in a first response segment 1i of the transmission signal s(t) and the frequency-offset-compensated phase value $\phi_{E2i}'$ of the response signal e(t) in the subsequent second response segment 2i of the transmission signal s(t) is calculated according to equation (2).

Since a phase drift $\phi(t)$ possibly occurring in the phase response $\phi_E(t)$ of the response signal e(t), is approximately unchanged between each of the two adjacent first and second response segments 1i and 2i of the transmission signal s(t), a phase drift $\phi_i$ is removed from the phase differences $\phi_{Ei}''$ calculated respectively between two adjacent first and second response segments 1i and 2i.

$$\phi_{Ei}'' = \phi_{E2i}' - \phi_{E1i}' \quad (2)$$

FIG. 7A shows the response of the measured frequency-offset-compensated phase values $\phi_{E1i}'$ and $\phi_{E2i}'$ of the response signal e(t)—continuous line in FIG. 7A, which results from a phase distortion because of the AM-PM characteristic and the phase drift $\phi_i$, and the response of the individual phase drifts $\phi_i$—broken lines in FIG. 7A. If a phase drift $\phi_i$ is removed from the measured frequency-offset-compensated phase values $\phi_{E1i}'$ and $\phi_{E2i}'$ of the response signal e(t) according to equation (2), the response of the frequency-offset and phase-drift compensated phase values $\phi_{Ei}''$, which result exclusively from the phase distortion of the AM-PM characteristic of the transmission link 14, are obtained as presented in FIG. 7B.

In the final procedural stage S60, the AM-PM characteristic of the transmission link 14 is determined by forming the difference between the frequency-offset-compensated and phase-drift-compensated phase values $\phi_{Ei}''$ and the phase values $\phi_{s1i}$ or $\phi_{s2i}$ in the first or second response segment 1i or 2i of the transmission signal s(t) and subsequent division by the respective amplitude value $|s_{1i}|$ of the test signal s(t) in the first response segment 1i.

The method presented in FIG. 4 is based upon a presentation and calculation in polar coordinates (absolute value and phase). Alternatively, the method, especially the measurement of the response signal e(t)—procedural stage S20 in FIG. 4—and the compensation of the frequency offset $\Delta\omega$—procedural stage S50 in FIG. 4—, can also be implemented in Cartesian coordinates (in-phase and quadrature component), wherein a transformation of IQ coordinates into polar coordinates is required following the determination of the AM-AM and the AM-PM characteristic. In this manner, the sequence of the individual procedural stages in FIG. 4 is altered, and an additional procedural stage of a coordinate transformation is implemented.

The invention is not restricted to the embodiment presented. In particular, the measurement of other communications transmission links, for example, filters, mixers etc. and other transmission signals according to different modulation methods and standards, is covered by the invention.

The invention claimed is:

1. A method for determining an amplitude and/or the phase of an output signal of a transmission link dependent upon the amplitude of an input signal, comprising:
   applying a test signal (s(t)) to the transmission link;
   determining a response signal (e(t)) resulting from amplitude and/or phase distortion in the transmission link;
   determining the amplitude and/or the phase of the output signal of the transmission link from the amplitude response (|e(t)|) of the response signal (e(t)) and/or of the phase responses ($\phi_s(t)$, $\phi_E(t)$) of the test signal (s(t)) and of the response signal (e(t)) dependent upon the amplitude (|s(t)|) of the test signal (s(t)),
   wherein the amplitude response (|s(t)|) of the test signal (s(t)) consists of several first and second response segments (1i,2i) with constant amplitude values ($|s_{1i}|$, $|s_{2i}|$) over the duration ($\Delta T$) of the respective first or second response segment (1i, 2i), the amplitude response (|s(t)|) of the test signal (s(t)) providing in an alternating manner first response segments (1i) with amplitude values ($|s_{1i}|$) changed relative to one another and second response segments (2i) with amplitude values ($|s_{2i}|$) unchanged relative to one another; wherein the amplitude values ($|s_{1i}|$) of successive first response segments of the test signal (s(t)) diminish and the amplitude values ($|s_{2i}|$) of the second response segments (2i) of the test signal (s(t)) correspond to the largest amplitude value ($|s_{1i}|$) of the first response segments (1i) of the test signal (s(t)).

2. The method according to claim 1, characterised in that an AM-AM characteristic of the transmission link is determined from the amplitude values ($|s_{1i}|$, $|e_{1i}|$) of the test signal (s(t)) and of the associated response signal (e(t)) in the first response segments (1i).

3. The method according to claim 1, characterised in that the phase response ($\phi_s(t)$) of the test signal (s(t)) provides constant and identical phase values ($\phi_{s1i}$, $\phi_{s2i}$) in all first and second response segments (1i, 2i).

4. The method according to claim 3, characterised in that the phase values ($\phi_{s1i}$, $\phi_{s2i}$) of the phase response ($\phi_s(t)$) of the test signal (s(t)) provide the value zero in all first and second response segments (1i, 2i).

5. A method for determining an amplitude and/or the phase of an output signal of a transmission link dependent upon the amplitude of an input signal, comprising:
   applying a test signal (s(t)) to the transmission link;
   determining a response signal (e(t)) resulting from amplitude and/or phase distortion in the transmission link;
   determining the amplitude and/or the phase of the output signal of the transmission link from the amplitude response (|e(t)|) of the response signal (e(t)) and/or of the phase responses ($\phi_s(t)$, $\phi_E(t)$) of the test signal (s(t))

and of the response signal (e(t)) dependent upon the amplitude (|s(t)|) of the test signal (s(t)), wherein the amplitude response (|s(t)|) of the test signal (s(t)) consists of several first and second response segments ($1i, 2i$) with constant amplitude values ($|s_{1i}|, |s_{2i}|$) over the duration ($\Delta T$) of the respective first or second response segment ($1i, 2i$), the amplitude response (|s(t)|) of the test signal (s(t)) providing in an alternating manner first response segments ($1i$) with amplitude values ($|s_{1i}|$) changed relative to one another and second response segments ($2i$) with amplitude values ($|s_{2i}|$) unchanged relative to one another; and wherein a non-frequency-offset-compensated phase response ($\phi_s(t)$) of the response signal (e(t)) is transferred with constant phase values ($\phi_{E1i}, \phi_{E2i}$) over the duration ($\Delta T$) of the first and second response segments ($1i, 2i$) by compensation of a frequency offset ($\Delta\omega_{avg}$) occurring as an average in a frequency-offset-compensated phase response ($\phi_E'(t)$) with constant phase values ($\phi_{E1i}', \phi_{E2i}'$) over the duration ($\Delta T$) of the first and second response segments ($1i, 2i$).

6. The method according to claim 5, characterised in that an AM-PM characteristic of the transmission link is determined from the differences (($\phi_{E1i}'-\phi_{E1i}')-\phi_{s1i}$, ($\phi_{E1i}'-\phi_{E2i}')-\phi_{s2i}$) of the phase-value difference ($\phi_{E1i}'-\phi_{E1i}'$) of successive first and second response segments ($1i, 2i$) of the frequency-offset-compensated phase response ($\phi_E'(t)$) of the response signal (e(t)) and of the phase value ($\phi_{s1i}, \phi_{s2i}$) in the first or second response segments ($1i, 2i$) of the phase response ($\phi_s(t)$) of the test signal (s(t)) dependent upon the amplitude values ($|s_{1i}|$) of the test signal (s(t)) in the first response segments ($1i$).

7. The method according to claim 5, characterised in that the amplitude values ($|s_{2i}|, |s_{1i}|$) and phase values ($\phi_{s1i}, \phi_{E1i}, \phi_{s2i}, \phi_{E2i}$) in the first and second response segments ($1i, 2i$) of the test signal (s(t)) and of the associated response signal (e(t)) are determined respectively within a time interval ($\Delta T'$) of the first and second response segment ($1i, 2i$), which is reduced by comparison with the duration ($\Delta T$) of the first and second response segment ($1i, 2i$) by one uncertainty interval ($\Delta T'$) respectively at the beginning and at the end of each first and second response segment ($1i, 2i$).

8. The method according to claim 5, characterised in that the frequency offset ($\Delta\omega_{avg}$) occurring as an average is calculated by forming an average value from the frequency offsets ($\Delta\omega_{1i}, \Delta\omega_{2i}$) determined respectively in the first and second response segments ($1i, 2i$) and weighted with the amplitude values ($|s_{1i}|, |s_{2i}|$) of the test signal (s(t)) in the first and second response segments ($1i, 2i$).

* * * * *

UNITED STATES PATENT AND TRADEMARK OFFICE
CERTIFICATE OF CORRECTION

| | | |
|---|---|---|
| PATENT NO. | : 8,019,286 B2 | |
| APPLICATION NO. | : 11/914379 | |
| DATED | : September 13, 2011 | |
| INVENTOR(S) | : R. Lorenzen | |

It is certified that error appears in the above-identified patent and that said Letters Patent is hereby corrected as shown below:

| COLUMN | LINE | ERROR |
|---|---|---|
| 9 (Claim 6, | 24 line 3) | " $(\phi_{E1i}'-\phi_{E1i}')$ " should read -- $(\phi_{E1i}'-\phi_{E2i}')$ -- |
| 9 (Claim 6, | 24 line 3) | " $(\phi_{E1i}-\phi_{E2i}')$ " should read -- $(\phi_{E1i}'-\phi_{E2i}')$ -- |
| 9 (Claim 6, | 25 line 4) | " $(\phi_{E1i}'-\phi_{E1i}')$ " should read -- $(\phi_{E1i}'-\phi_{E2i}')$ -- |

Signed and Sealed this
Fifth Day of June, 2012

David J. Kappos
*Director of the United States Patent and Trademark Office*